United States Patent [19]

Moschovis et al.

[11] Patent Number: 4,794,133
[45] Date of Patent: Dec. 27, 1988

[54] ACRYLATED POLYURETHANES BASED ON POLYOXYTETRAMETHYLENE GLYCOLS EXTENDED WITH ETHYLENICALLY UNSATURATED DICARBOXYLIC ACIDS

[75] Inventors: Elias P. Moschovis, Des Plaines; Joseph J. Stanton, Buffalo Grove; Clive J. Coady, Hanover Park, all of Ill.

[73] Assignee: DeSoto, Inc., Des Plaines, Ill.

[21] Appl. No.: 140,675

[22] Filed: Jan. 4, 1988

[51] Int. Cl.$^4$ ............................................. C08G 18/42
[52] U.S. Cl. ..................................... 524/99; 524/718; 525/185; 525/455; 528/73; 528/75
[58] Field of Search .................. 524/99, 718; 525/185, 525/455; 528/73, 75

[56] References Cited
U.S. PATENT DOCUMENTS 4,629,287 12/1986 Bishop ................................... 528/75

Primary Examiner—Maurice J. Welsh
Attorney, Agent, or Firm—Dressler, Goldsmith, Shore, Sutker & Milnamow, Ltd.

[57] ABSTRACT

An ultraviolet-curable coating composition adapted for the buffer coating of optical glass fiber consists essentially of an acrylate-capped polyurethane in admixture with at least about 25% of its weight of liquid monoethylenically unsaturated monomer having a low glass transition temperature below about 0° C. and at least about 3% of N-vinyl pyrrolidone based on the weight of the low glass transition temperature monomer. The acrylate-capped polyurethane is based on a generally linear polyurethane which is the reaction product of organic diisocyanate with a stoichiometric deficiency of a modified diol which is the diester reaction product of polyoxytetramethylene glycol having a molecular weight of from about 200 to about 2000 with a stoichiometric deficiency of an ethylenically unsaturated dicarboxylic acid or substitution product thereof, especially fumaric acid, to provide a higher molecular weight polyoxytetramethylene glycol which includes ester groups and copolymerizable ethylenic unsaturation which minimize crystallinity problems.

15 Claims, No Drawings

ACRYLATED POLYURETHANES BASED ON POLYOXYTETRAMETHYLENE GLYCOLS EXTENDED WITH ETHYLENICALLY UNSATURATED DICARBOXYLIC ACIDS

TECHNICAL FIELD

This invention relates to acrylated polyurethanes based on polyoxytetramethylene glycols which are chain extended with an ethylenically unsaturated dicarboxylic acid, especially fumaric acid, in order to minimize the crystallinity which characterizes such polyurethanes.

BACKGROUND ART

Acrylated polyurethanes are well known for use in the buffer coating of optical glass fiber. These polyurethanes are typically formed by reacting polyoxyalkylene ether glycols with organic diisocyanates to form isocyanate-terminated polyurethanes which are capped with a monohydric acrylate, such as 2-hydroxyethyl acrylate. Various polyoxyalkylene ether glycols can be used, and it is preferred to employ those in which the repeating unit is a tetramethylene ether group (derived by reacting a polyoxytetramethylene glycol with the diisocyanate) because the tetramethylene ether group is more resistant to water than the corresponding ethylene ether or propylene ether group.

Unfortunately, the use of polyoxytetramethylene glycol introduces undesired crystallinity which causes the coatings to become harder and less flexible when low service temperatures are encountered. This crystallinity need only pervade portions of the coating in order to cause difficulty. This leads to microbending difficulties which are unacceptable. Thus, it is desired to take advantage of the superior water resistance conferred through the use of polyoxytetramethylene glycol, but this opportunity is limited by the undesired crystallinity it introduces.

DISCLOSURE OF INVENTION

In accordance with this invention, an ultraviolet-curable coating composition adapted for the buffer coating of optical glass fiber consists essentially of an acrylate-capped polyurethane, which may contain urea groups, in admixture with at least about 25% of the weight of the acrylate-capped polyurethane of liquid monoethylenically unsaturated monomer having a low glass transition temperature below about 0° C. to provide a low modulus of elasticity at low service temperature, and at least about 3% of the weight of the low glass transition temperature monomer of N-vinyl pyrrolidone. A liquid linear aliphatic diacrylate in which the two acrylate groups are separated by a chain of at least six carbon atoms or a molecular weight of from about 400 to about 4000 is also preferably present, as shown in U.S. Pat. No. 4,629,287 to T. E. Bishop, in an amount of 5% to 30%, preferably from 10% to 25% of the weight of the composition to help provide good low temperature properties and good water resistance. The liquid diacrylate component is optional and can be omitted.

The acrylate-capped polyurethane is based on a generally linear polyurethane which is the reaction product of organic diisocyanate with a stoichiometric deficiency of a modified diol. The modified diol is a diester reaction product of polyoxytetramethylene glycol with a stoichiometric deficiency of an ethylenically unsaturated dicarboxylic acid or ester-forming substitution product thereof to provide a higher molecular weight polyoxytetramethylene glycol which includes ester groups and polymerizable ethylenic unsaturation. Fumaric acid is particularly preferred, but maleic acid or anhydride are also useful, as are substitution products thereof, such as lower alkyl (methyl) or halo (chloro) substituted maleic or fumaric acid. Mono- or di- substitution products are both useful. Fumaric acid itself polymerizes better with the N-vinyl pyrrolidone component and is preferred because copolymerization minimizes incompatibility and crystallinity.

As a result of the use of the modified glycol having higher molecular weight and ester groups and providing polymerizable ethylenic unsaturation to complex the polyoxytetramethylene repeating units, the crystallinity of ultraviolet-cured coatings is minimized. The result is greater water resistance combined with superior low temperature microbending resistance. Moreover, these important characteristics are achieved using a composition which cures rapidly on ultraviolet exposure, and this is a further feature of this contribution.

The stoichiometric deficiency of the dicarboxylic acid or anhydride is defined as a molar ratio of from about 0.3 to about 0.8 mole of the unsaturated acid or anhydride per mole of the polyoxytetramethylene glycol. The preferred molar ratio is from 0.5 to 0.7 mole of the unsaturated acid or anhydride per mole of the polyoxytetramethylene glycol. This stoichiometric deficiency produces an ester product largely constituted by diester.

The proportion of low glass transition temperature monomer is desirably from 25% to 75%, more preferably from 35% to 60%, based on the weight of the polyacrylate-terminated polyurethane. Larger proportions of the low glass transition temperature monomer will be used when the liquid diacrylate component is absent, up to about 120% of the weight of the polyacrylate-terminated polyurethane. The monoethylenically unsaturated liquid component helps to provide the low modulus needed for buffer coating optical glass fiber, and it also helps to provide the coating composition with a viscosity suitable for coating application. These aspects of this invention are themselves well known.

It is preferred that the N-vinyl pyrrolidone constitute from 5% to 30% of the low glass transition temperature monoethylenically unsaturated liquid component, preferably from 7% to 15% of that component.

The liquid diacrylates which are also preferably present are more fully discussed in the said Bishop patent and are illustrated herein by $C_{14-15}$ diol diacrylates which are typified by the commercial product Chemlink 2000 available from Sartomer Company, West Chester Pa. Polyoxybutylene glycol diacrylate having a molecular weight of 1150 will further illustrate useful materials of this type.

Polyacrylate-terminated polyurethanes are known to be made from a diol component, a diisocyanate component and a monohydric acrylate capping agent which is used to cap the isocyanate-terminated linear oligomer. The monohydric acrylate is usually a monoacrylate, such as 2-hydroxyethyl acrylate, and this provides diacrylate-terminated polyurethanes. On the other hand, monohydric polyacrylates, such as pentaerythritol triacrylate, are also useful and they provide a plurality of acrylate groups at each end of the linear oligomer.

While the modified diol described previously is preferably the only difunctional component used other than the diisocyanate, it is permissible to include small proportions of other diols or diamines, such as 1,6-hexane diol or 1,6-hexane diamine, (which introduces some urea groups to enhance the physical strength of the coatings).

Any organic diisocyanate can be used, such as toluene diisocyanate or isophorone diisocyanate, but this component is no different herein than in the prior art, so the full range of organic diisocyanates are useful, including diisocyanates in which a linear aliphatic chain containing at least 6 carbon atoms separates the two isocyanate groups, such as dimer fatty acid diisocyanates, are used to further enhance low temperature flexibility.

A small proportion of trifunctional reactant, up to about 10% of the total weight of difunctional reactants in said polyurethane, can be used, such as trimethylol propane, to provide limited branching in the generally linear polyurethane oligomer used herein, but this is usually not used.

The compositions of this invention normally are to have an index of refraction of about 1.54–1.55, and possess a tensile modulus which enables microbending difficulties to be avoided down to around −60° C.

The polyoxytetramethylene glycol which is modified per this invention may have a molecular weight of from about 200 up to about 2000, and these will be illustrated herein by a polyoxytetramethylene glycol of molecular weight 1000.

When a small amount of other difunctional material (up to about 10 percent of total diol) is used, these are illustrated by 1,4-butane diol, 1,6-hexane diol, or the like. A suitable diamine which may be used in the same small proportion is 1,6-hexane diamine or, preferably, a diamino polyether such as polyoxypropylene diamine having a molecular weight of from about 200 to about 2000.

The molecular weights herein are calculated from the reactivity of the compounds based on their theoretical formulas.

A corresponding small proportion of dihydroxyfunctional polyesters (up to about 10% of total difunctional isocyanate-reactive material) are also useful, and these are illustrated by polycaprolactone glycols, such as the commercially available Tone 0240 from Union Carbide Corporation which is a polycaprolactone glycol having a molecular weight of about 2000.

The reaction between the previously described diisocyanate, which is used in a stoichiometric excess of about one mole of diisocyanate per hydroxy group, and the diol forms a polyurethane diisocyanate. When somewhat higher molecular weight oligomers are desired, the excess of diisocyanate can be somehat less than one mole thereof per hydroxy group.

The polyurethane oligomers are usually linear oligomers which are isocyanate-terminated and are end capped with an hydroxy acrylate, such as a $C_2$ to $C_4$ hydroxyalkyl acrylate. These are typified by the preferred 2-hydroxyethyl acrylate, but the corresponding hydroxy esters formed from propylene oxide or butylene oxide can replace the 2-hydroxyethyl acrylate which is formed by the reaction of ethylene oxide and acrylic acid.

The production of the capped polyacrylate polyurethane is conventional and is subject to considerable variation from the standpoint of the order of reaction, as is also well known.

The low glass transition temperature monomer is usually a liquid monoacrylate monomer having a glass transition temperature below −20° C., and it is used to provide softness at low temperature and also to help dissolve the normally solid diacrylate polyurethanes to provide the coating composition with an appropriate coating viscosity. Liquid diacrylate of the type defined previously may be present to assist the low glass transition temperature monomers to provide good low temperature properties and coating viscosity.

In this invention it is found that the diacrylate polyurethanes in combination with low glass transition temperature monomer and N-vinyl pyrrolidone cure, on ultraviolet exposure in the presence of appropriate photoinitiators, to provide soft coatings which retain low modulus down to very low temperature. The N-vinyl pyrrolidone is particularly effective to induce copolymerization of the fumaric acid component in the ester diol, and this is what allows fumaric, maleic or similar unsaturated acid or anhydride to be used to eliminate the normally encountered crystallinity.

As a result, this application provides a rapid curing buffer coating for optical glass fiber which provides good water resistance and combines acceptable room and elevated temperature strength with lower modulus at −60° C. and resistance to crystallinity in order to provide acceptable microbending resistance at low service temperature.

The glass transition temperature of the monomer is the glass transition temperature of a homopolymer of the monomer, and this is a conventional identification of the character of a monomer. Suitable low glass transition temperature monomers are illustrated by ethoxyethoxyxyethyl acrylate, phenoxyethyl acrylate, nonyl-substituted phenoxyethyl acrylate, butoxyethyl acrylate, 2-hydroxyethyl acrylate, and mixtures thereof.

The coating compositions of this invention are intended to be cured with ultraviolet light, so photoinitiators are normally present in an amount of from 0.5% to 8%, preferably from 2% to 5%. These are conventional components of ultraviolet curing ethylenically unsaturated coatings, the usual photoinitiators being ketonic, such as benzophenone, acetophenone, diethoxy acetophenone, m-chloro-acetophenone, propiophenone, thioxanthone, benzoin, benzil, anthraquinone, and the like. A suitable photoinitiator is 2,2-dimethoxy 2-phenyl acetophenone which is available in commerce under the trade designation Irgacure 651. Another suitable photoinitiator is the combination of Irgacure 907 (2-methyl-1-[4-(methylthio)phenyl]-2-morpholinopropanone-1 with isopropylthioxanthone. 2,4,6-trimethylbenzoyldiphenyl phosphine oxide is also useful. We presently prefer to use Irgacure 184 which is hydroxycyclohexyl phenyl ketone.

These photoinitiators are used alone or in admixture with one another, and amines, like diethyl amine, can be added as photosensitizer, though this is not normally needed.

The coating compositions of this invention are normally free of volatile organic solvents because these would have to be evaporated prior to ultraviolet exposure, which would slow the curing system.

EXAMPLE

Into a reaction vessel fitted with stirrer, a water-cooled condenser, a thermometer and a gas inlet tube are placed 2.2 moles (220 gms) of polytetramethylene ether glycol (PTMEG) [available from E. I. DuPont de Nemours and Co., Inc. under the trade designation Terathane 1000] and 1 mole of fumaric acid. The reaction mixture is heated to about 200° C. with stirring and nitrogen sparging and the reaction is continued for about 12 hours until the acid value is about 1.0. The product obtained, which is the diester of fumaric acid, is subsequently reacted with a diisocyanate in the presence of Desmodur W (from Mobay Chemical Co.) which is a saturated version of methylene diphenyl 4,4'-diisocyanate.

More particularly, Desmodur W is added to the diester reaction product in a molar ratio of 1:2 (the diisocyanate in excess) at 38° C. using a dry nitrogen sparge. The addition of diisocyanate is over a period of 10 minutes using cooling, as needed, to avoid any temperature increase above 40° C. 0.02% of dibutyl tin dilaurate are added to the diester to catalyze the reaction along with 0.1% of phenothiazine to inhibit oxidation. These proportions are based on the total weight of reactants.

After all the Desmodur W is present, heat is applied to increase the temperature to about 60° C. The viscosity begins to increase, and after 2½ hours stirrability is maintained by adding 7% of total weight of phenoxyethyl acrylate. After 10 minutes hydroxyethyl acrylate is added slowly over 12 minutes and, at this point, the dry nitrogen is replaced by dry air and the heat is controlled at about 60° C. and the NCO content is monitored for the next 8 hours. The reaction is continued until the NCO peak monitored via IR spectrum is no longer observable. Additional phenoxyethyl acrylate is added with stirring to a solids content of 70%, and the reaction product then cools to room temperature. The viscosity of the product is 192,400 centipoises.

64 parts of the above 70% solution is mixed with 5 parts of phenoxyethyl acrylate, 20 parts of a $C_{14-15}$ diol diacrylate mxture (Chemlink 2000 from Sartomer Company, West Chester Pa. may be used) to provide a formulation which is catalyzed with 4% of the weight of the composition of hydroxycyclohexyl phenyl ketone to be ready for application to optical glass fiber and cure by ultraviolet exposure. It is also preferred to add 1.0% of the weight of the composition of the methacrylate ester of gamma hydroxypropyl trimethoxy silane and 1.0% of the weight of the composition of a fluorocarbon acrylate surfactant to lower surface tension, but these are optional components.

3 mil coatings were applied to a glass substrate and cured by exposure to ultraviolet light having a wavelength ranging from about 260 to about 380 nanometers. The ultraviolet dose is about 1.0 Joules per square centimeter. The ultraviolet-cured coatings are stripped off the glass substrate and tested by immersion in water for 24 and 48 hours, the coatings being weighed before immersion and after each immersion. The highest weight gain value reached in the two immersions is reported in percent of the initial film and is 0.42% in this example. The water-containing coatings are then dried at room temperature for 5 days and weighed again after drying to find the percent weight loss which indicates how much material was extracted from the original coating by the immersion in water. In this example the weight loss was 0.56%. Adding the two values provides a total weight change of 0.98% from the two experiments which total is referred to as the water sensitivity. Commercial polyurethane polyacrylate buffer coatings for optical glass fiber now in use exhibit a water sensitivity of from 2.0% to 4.0% in the described test, and the lower value reported in this example represents an important improvement.

The cure speed was measured to determine the ultraviolet dosage required to provide a cure which reaches 95% of the final film modulus. In this example the required dosage was 0.75 Joules per square centimeter. The commercial polyurethane polyacrylate buffer coatings require 1.4 Joules per square centimeter to cure to the same 95% of final film modulus. Faster cure is an added advantage.

Testing the cured film of this example for low temperature modulus, the modulus at −40° C., was 635 megapascals. In contrast, the commercial polyurethane polyacrylate buffer coatings typically possess a modulus at −40° C. of 1585 megapascals. Lower modulus at low temperature indicates the absence of crystallinity in the cured coatings of this invention and superior microbending resistance.

Accordingly, this invention provides a significant improvement in resistance to water and low temperature modulus. Cure speed is also improved.

The coatings of this invention are applied to freshly drawn optical glass fiber having a diameter of about 125 microns in a thickness of about 125 microns and are cured by passing the coated fiber through two tandemly arranged 10 inch 300 watts medium pressure vapor lamp at 1.5 meters per second.

What is claimed is:

1. An ultraviolet-curable coating composition adapted for the buffer coating of optical glass fiber, consisting essentially of an acrylate-capped polyurethane, which may contain urea groups, in admixture with at least about 25% of the weight of the acrylate-capped polyurethane of liquid monoethylenically unsaturated monomer having a low glass transition temperature below about 0° C. and at least about 3% of N-vinyl pyrrolidone based on the weight of said low glass transition temperature monomer, said acrylate-capped polyurethane being based on a generally linear polyurethane which is the reaction product of organic diisocyanate with a stoichiometric deficiency of a modified diol, said modified diol being the diester reaction product of polyoxytetramethylene glycol having a molecular weight of from about 200 to about 2000 with a stoichiometric deficiency of an ethylenically unsaturated dicarboxylic acid or ester-forming substitution product thereof to provide a higher molecular weight polyoxytetramethylene glycol which includes ester groups and copolymerizable ethylenic unsaturation.

2. An ultraviolet-curable coating composition as recited in claim 1 in which said dicarboxylic acid is fumaric acid.

3. An ultraviolet-curable coating composition as recited in claim 1 in which the stoichiometric deficiency is a molar ratio of from about 0.3 to about 0.8 mole of said unsaturated acid or substitution product thereof per mole of polyoxytetramethylene glycol.

4. An ultraviolet-curable coating composition as recited in claim 3 in which the stoichiometric deficiency is a molar ratio of from about 0.5 to about 0.7 mole of said dicarboxylic acid per mole of polyoxytetramethylene glycol, and said dicarboxylic acid is fumaric acid.

5. An ultraviolet-curable coating composition as recited in claim 1 in which said N-vinyl pyrrolidone constitutes from 5% to 30% of the weight of said monoethylenically unsaturated liquid component.

6. An ultraviolet-curable coating composition as recited in claim 4 in which said N-vinyl pyrrolidone constitutes from 7% to 15% of the weight of said monoethylenically unsaturated liquid component.

7. An ultraviolet-curable coating composition as recited in claim 1 in which a liquid linear aliphatic diacrylate in which the two acrylate groups are separated by a chain of at least six carbon atoms or a molecular weight of from about 400 to about 4000 is also present in an amount of from 5% to 30% of the total weight of the composition.

8. An ultraviolet-curable coating composition as recited in claim 7 in which said liquid linear aliphatic diacrylate is present in an amount of from 10% to 25%.

9. An ultraviolet-curable coating composition as recited in claim 1 in which said polyurethane contains less than 10% of trifunctional component based on the total weight of difunctional reactants in said polyurethane.

10. An ultraviolet-curable coating composition as recited in claim 1 in which said polyurethane is capped with 2-hydroxyethyl acrylate.

11. An ultraviolet-curable coating composition as recited in claim 1 in which said composition includes from 0.5% to 8% of a ketonic photoinitiator.

12. An ultraviolet-curable coating composition as recited in claim 1 in which said low glass transition temperature monomers are acrylate ethers having a glass transition temperature below $-20°$ C.

13. An ultraviolet-curable coating composition as recited in claim 12 in which said low glass transition temperature monomers are selected from the group consisting of ethoxyethoxyethyl acrylate, phenoxyethyl acrylate, hydrocarbon-substituted phenoxyethyl acrylate, butoxyethyl acrylate, 2-hydroxyethyl acrylate, and mixtures thereof.

14. An ultraviolet-curable coating composition as recited in claim 12 in which said low glass transition temperature monomer is phenoxyethyl acrylate.

15. An optical glass fiber buffer coated with an ultraviolet-cured coating of the coating composition of claim 1.

* * * * *

UNITED STATES PATENT AND TRADEMARK OFFICE
CERTIFICATE OF CORRECTION

PATENT NO. : 4,794,133

DATED : Dec. 27, 1988

INVENTOR(S) : Elias P. Moschovis et al.

It is certified that error appears in the above-identified patent and that said Letters Patent is hereby corrected as shown below:

Column 2, line 51, "$C_{14-15}$" should read: --$C_{14-15}$--; and

Column 4, line 67, "220" should read: --2200-- .

Signed and Sealed this

Twenty-fifth Day of April, 1989

*Attest:*

DONALD J. QUIGG

*Attesting Officer*   *Commissioner of Patents and Trademarks*